United States Patent [19]

Kitagawa et al.

[11] Patent Number: 5,353,435
[45] Date of Patent: Oct. 4, 1994

[54] MICROCOMPUTER WITH CIRCUIT FOR GENERATING MULTIPLE PULSES EACH HAVING DIFFERENT FREQUENCIES

[75] Inventors: Hirokazu Kitagawa; Naoki Yamauchi, both of Hyogo, Japan

[73] Assignee: Mitsubishi Denki Kabushiki Kaisha, Tokyo, Japan

[21] Appl. No.: 864,999

[22] Filed: Apr. 8, 1992

[30] Foreign Application Priority Data

Apr. 12, 1991 [JP] Japan .................. 3-108952

[51] Int. Cl.⁵ .................................... G06F 1/08
[52] U.S. Cl. .................................... 395/550
[58] Field of Search ........................ 395/550

[56] References Cited

U.S. PATENT DOCUMENTS

| | | | |
|---|---|---|---|
| 4,222,103 | 9/1980 | Chamberlin | 364/200 |
| 4,287,562 | 9/1981 | Darden et al. | 395/550 |
| 4,348,743 | 9/1982 | Dozier | 395/550 |

*Primary Examiner*—Robert L. Richardson
*Attorney, Agent, or Firm*—Townsend and Townsend Khourie and Crew

[57] ABSTRACT

In a microcomputer according to the present invention, output pulse levels are stored in bit coles corresponding to respective addresses of a memory circuit which are outputted from a timer circuit which uses a clock as a count source, and each bit output of the memory circuit is latched in synchronism with the clock and outputted to a port output circuit, so as to obtain a plurality of desired phase pulses having different cycles.

4 Claims, 5 Drawing Sheets

MICROCOMPUTER WITH CIRCUIT FOR GENERATING MULTIPLE PULSES EACH HAVING DIFFERENT FREQUENCIES

BACKGROUND OF THE INVENTION

1. Field of the Invention

The present invention relates to a microcomputer comprising a circuit which generates a plurality of desired phase pulses having different cycles within a cycle of a timer circuit which uses a clock as a count source.

2. Description of the Prior Art

Conventionally, the circuit of a microcomputer which generates desired phase pulses within a cycle of a timer circuit which uses a clock as a count source is structured as shown in FIG. 5.

In FIG. 5, reference numeral 1 represents a timer circuit which uses a clock such as a clock outputted by a clock generating circuit, an external clock and a clock divided by a timer (hereinafter referred to as "clock A") as a count source, 7a and 7b registers for retaining desired setting data, 5a and 5b comparators for comparing the data of the registers 7a and 7b with the output of the timer circuit 1, 8 a flip-flop for setting and resetting a port output circuit with the outputs of the comparators 5a and 5b, and 4A a port output circuit for outputting the data to a port.

The operation of the microcomputer will be as follows. In FIG. 5, "5" and "A" are set in the registers 7a and 7b, respectively, as an example. When the timer circuit 1 becomes "5", the value coincides with the setting of the register 7a, and accordingly, the comparator 5a sets the flip-flop 8 so that "HIGH" is outputted to the port output circuit 4A. Next, when the timer circuit 1 becomes "A", the value coincides with the setting of the register 7b, the comparator 5b resets the flip-flop 8 so that LOW is outputted to the port output circuit 4A.

The timing chart of this operation is shown in FIG. 6.

Since the circuit of the conventional microcomputer for generating desired phase pulses is structured as described in the foregoing, a plurality of circuits shown in FIG. 5 are required to generate a plurality of desired phase pulses having different cycles with the result of a large chip area of a microcomputer.

SUMMARY OF THE INVENTION

The present invention has been made to eliminate the above problems of a conventional microcomputer. It is an object of the invention to achieve a microcomputer which can generate a plurality of desired phase pulses having different cycles and can reduce the chip area thereof.

A microcomputer according to the present invention comprises a timer circuit which uses a clock as a count source, a memory circuit which stores output pulse levels in bit strings corresponding to each address outputted from the timer circuit, a latch circuit which latches each bit output of the memory circuit in synchronism with the clock, and a port output circuit which outputs each bit output of the latch circuit to a respective port.

The above and other objects, features and advantages of the invention will become more apparent from the following description when taken into conjunction with the accompanying drawings.

DESCRIPTION OF THE PREFERRED EMBODIMENT

Figure 1:
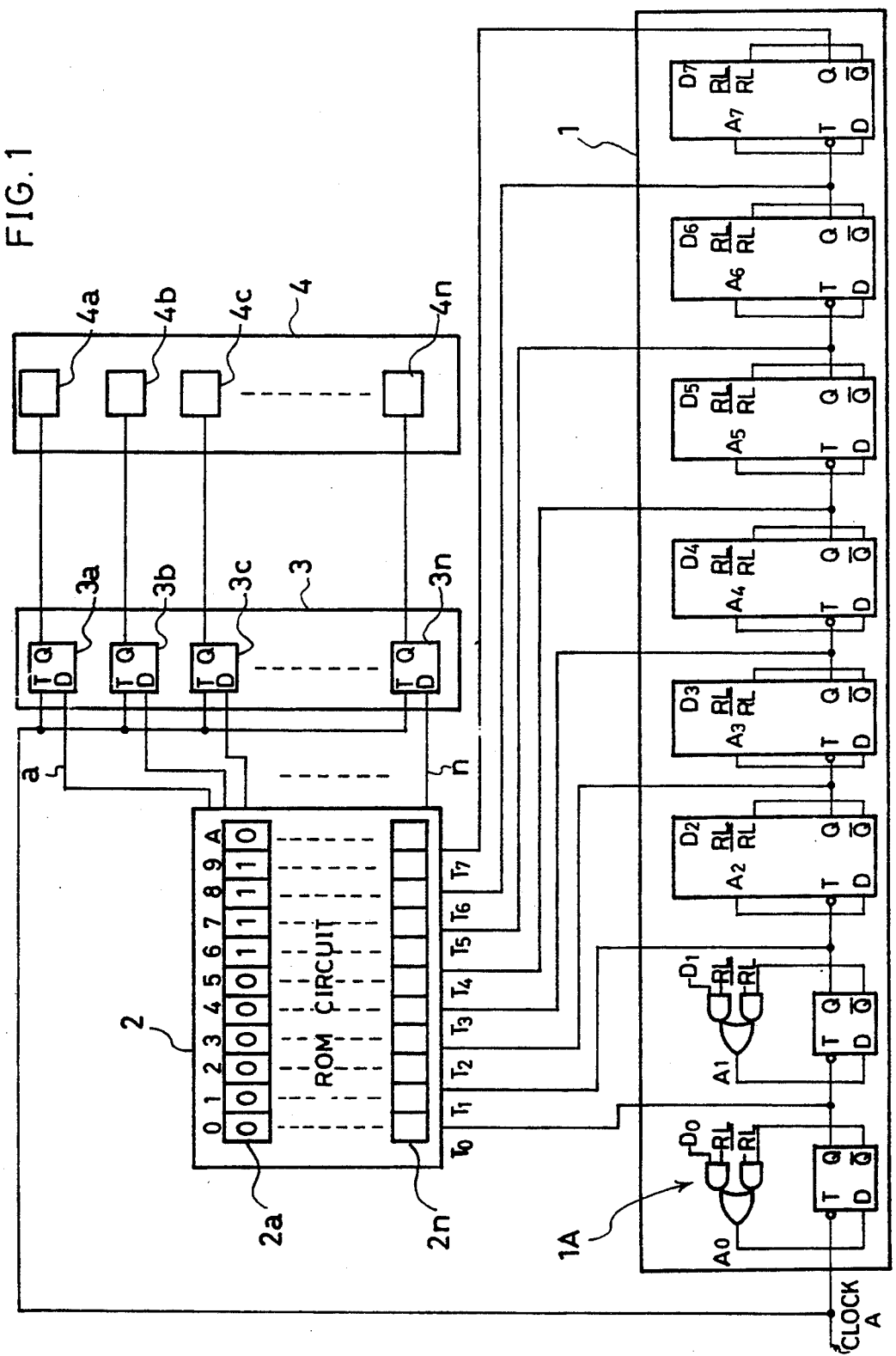
FIG. 1 is a circuit diagram of a microcomputer according to an embodiment of the present invention.
Figure 2:
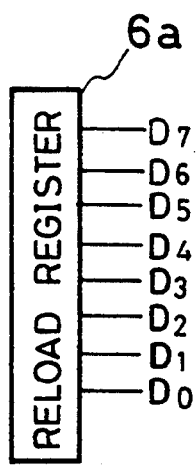
FIG. 2 is a circuit diagram of the embodiment.
Figure 3:
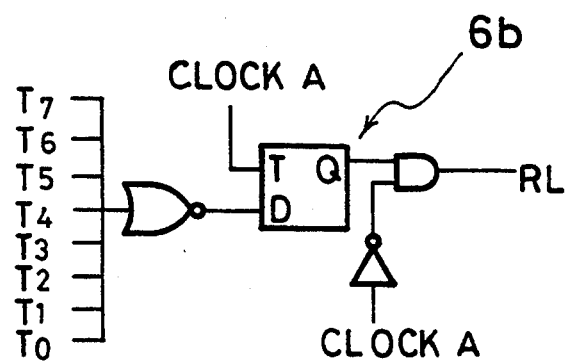
FIG. 3 is a circuit diagram of the embodiment.

Referring to FIGS. 1 to 3, there will be shown a circuit diagram of a microcomputer according to an embodiment of the present invention.

In FIG. 1, reference numeral 1 represents an 8-bit timer circuit for counting down (T0 to T3: lower bits, T4 to T7: upper bits). The timer circuit 1 has a reload register 6a as shown in FIG. 2 and a reload signal generating circuit 6b as shown in FIG. 3. The initial value of the timer circuit 1 is stored in the reload register 6a. Reference numeral 2 represents a ROM circuit which functions as a memory circuit to store output pulse levels in bit strings 2a to 2n (each string consists of 10 bits in this embodiment) corresponding to addresses O to A which are represented by values outputted from the timer circuit 1. That is, the ROM circuit 2 comprises the same number of n-bit memory areas, each corresponding to each address, as that of addresses, and has n bit strings consisting of the same number of bits as that of addresses. Reference numeral 3 represents a synchronous latch circuit which latches the bit outputs a to n of bit strings 2a to 2n of the ROM circuit 2 in synchronism with the rise of the clock A. 4 is a port output circuit for outputting each bit output of the synchronous latch circuit 3 to a respective port. The synchronous latch circuit 3 and the port output circuit 4 comprise a plurality of latches 3a to 3n and port outputs 4a to 4n, both corresponding to bit strings 2a to 2n.

The timer circuit 1 described above is returned to the initial value when each bit output (T0 to T7) becomes "0" and a reload signal (RL) "1" for reloading the timer is outputted from the reload signal generating circuit 6b to the reload circuit 1A. That is, the timer circuit functions as a binary down counter.

The operation of the timer circuit will be described next.

In the circuit structured as shown in FIG. 1, values outputted from the timer circuit 1 represent addresses, and the bit outputs a to n of bit strings 2a to 2n corresponding to the addresses are outputted to the latches 3a to 3n simultaneously. The port output 4a of a bit string 2a will be explained herein. As an example, "0" is written in the address A, "1" in addresses 9 to 6, and "0" in addresses 5 to 0 of a bit string 2a corresponding to the bit output a of the ROM circuit 2. The timer circuit 1 counts the fall of the clock A for counting down. The synchronous latch circuit 3 latches data on the rise of the clock A. The initial value of the reload register 6a should be "0A".

First, the timer circuit 1 begins to count down from "0A", and "0" is outputted to the bit output of the ROM circuit 2 corresponding to the port output 4a while a value outputted from the timer circuit 1 is "0A". When the output value of the timer 1 becomes "09", the bit output becomes "1", and HIGH is outputted to the port output 4a upon the next rise of the clock A. When the output value of the timer circuit 1 is "08 to 06", HIGH is maintained at the port output 4a because the ROM circuit 2 always outputs "1".

Next, when the value of the timer circuit 1 becomes "05", the bit output is "0", and LOW is outputted to the port output 4a upon the next rise of the clock A. When the value of the timer circuit 1 is "04 to 00", LOW is maintained at the port output 4a because the ROM circuit 2 always outputs "0".

In this way, the timer circuit 1 counts down. When the value of the timer circuit 1 becomes "00", "0A" is reloaded from the reload register 6a to the timer circuit 1 upon the next fall of the clock A. "0" is outputted to the bit output of the ROM circuit 2 corresponding to the port output 4a while the value of the timer circuit 1 is "0A". When the value of the timer circuit 1 becomes "09", the bit output becomes "1", and HIGH is outputted to the port output 4a upon the next rise of the clock A.

Figure 4:
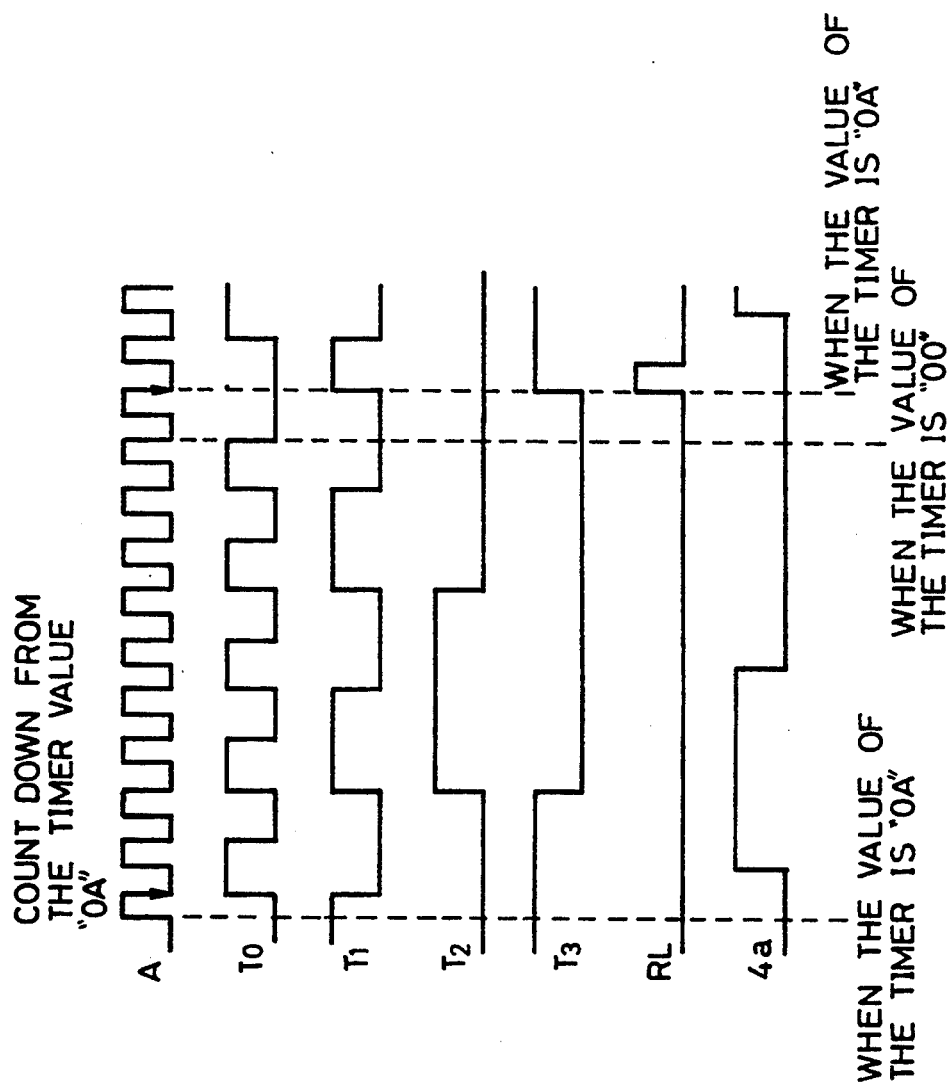
FIG. 4 is a timing chart of the embodiment.
Figure 5:
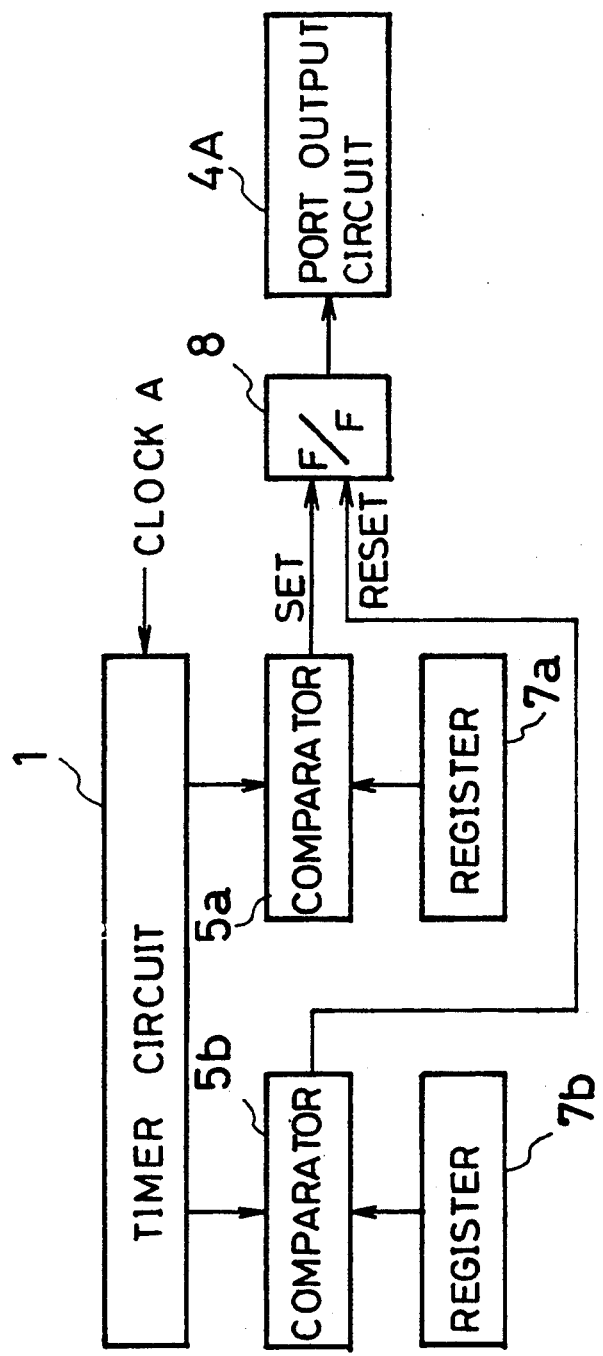
FIG. 5 is a circuit diagram of a conventional microcomputer.
Figure 6:
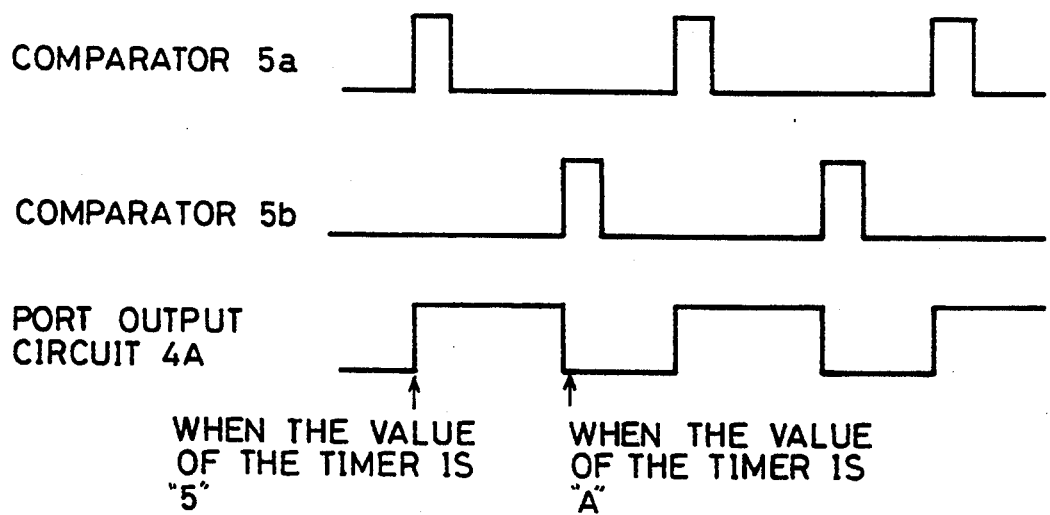
FIG. 6 is a timing chart of the circuit of FIG. 5.

The timing chart of this operation is shown in FIG. 4.

In this manner, a pulse waveform having a certain cycle can be obtained through the repetition of countdown by the timer circuit 1.

The port output 4a corresponding to the bit string 2a has been explained. It is possible to output a plurality of desired phase pulse waveforms having different cycles to port outputs 4a to 4n by making different from each other bit erring data, that is pulse levels, of the ROM circuit 2 corresponding to respective port outputs 4b to 4n.

As described in the foregoing, a microcomputer according to the present invention comprises a timer circuit which uses a clock as a count source, a memory circuit which stores output pulse levels in bit strings corresponding to respective addresses outputted from the timer circuit, a latch circuit which latches each bit output of the memory circuit in synchronism with the clock, and a port output circuit which outputs each bit output of the latch circuit to a respective port, thus making it possible to reduce the chip size of the microcomputer and to generate a plurality of desired phase pulses having different cycles within a cycle of the timer circuit.

What is claimed is:

1. A microcomputer comprising:
   a timer circuit having a clock as a count source;
   a memory circuit to store output pulse waveforms represented as bit strings;
   wherein said bit strings correspond to respective addresses output from said timer circuit;
   a latch circuit to latch each bit read from said memory circuit in synchronism with said clock; and
   a port output circuit to output each bit latched by said latch circuit to a corresponding port.

2. A microcomputer according to claim 1, wherein said latch circuit and said port output circuit comprise a plurality of latches and a plurality of port outputs each of said latches and said port outputs associated with an individual one of said bit strings, respectively.

3. A microcomputer according to claim 1, wherein said timer circuit further comprises a reload register.

4. A microcomputer according to claim 1, wherein said memory circuit is a ROM circuit.

* * * * *